Nov. 5, 1940.  B. C. PLACE  2,220,825
FASTENER
Filed Jan. 18, 1935
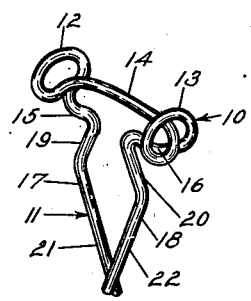
Fig. 1
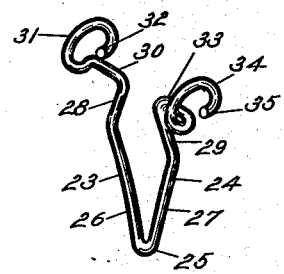
Fig. 2
Fig. 3
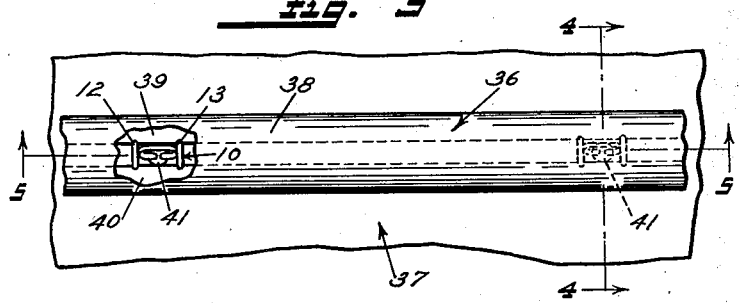
Fig. 4
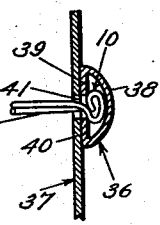
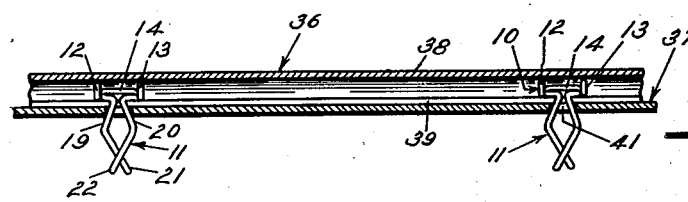
Fig. 5
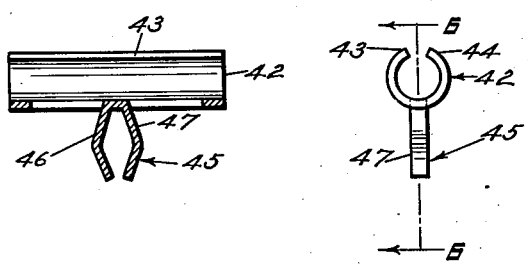
Fig. 6
Fig. 7
Inventor
Bion C. Place
Strauch & Hoffman
Attorneys Patented Nov. 5, 1940

2,220,825

UNITED STATES PATENT OFFICE 2,220,825

FASTENER

Bion C. Place, Detroit, Mich., assignor of one-half to George E. Gagnier, Detroit, Mich.

Application January 18, 1935, Serial No. 2,420

3 Claims. (Cl. 24—73)

This invention relates to spring or snap fasteners designed to secure a trim material, such as a molding, upon a supporting structure. More particularly, the invention is concerned with a novel form of fastener designed to permit a hollow molding, having inturned flanges, to be assembled with respect to the fasteners after the latter has been attached to the support upon which the molding is to be secured.

Heretofore in securing hollow moldings to various structures, such as automobiles for example, it has been the general practice to assemble the fasteners that are relied upon to secure the molding in place with respect to the molding before application of the latter to its supporting structure. The primary purpose of the present invention is to provide an improved form of snap fastener, that includes an expansible and contractible head, as well as an expansible and contractible shank, so that the fastener may, in situations in which it is desirable, be snapped into engagement with the supporting structure before the molding is associated with the fastener, the latter being brought into association with the fastener by causing it to spring upon the expansible and contractible head thereof.

Another object of the invention is to provide an improved spring fastener having an expansible and contractible shank and an expansible and contractible head, the shank and the head being capable of independent spring action.

Another object of the invention is to provide a spring or snap fastener designed especially for the securing of hollow moldings having spaced inturned flanges, which fastener is designed to be snapped between said flanges and provide a firm engagement with the molding at points relatively widely spaced along the length thereof.

Still another object of the invention is to provide an improved form of wire spring fastener having an expansible and contractible shank, formed from one part of the wire, and an independently expansible and contractible head formed from the other part thereof, whereby, because of the simplicity of its construction, the fastener may be produced at low cost and without waste of material.

The invention also aims to provide an improved arrangement of molding supporting structure and spring fastener having the inherent characteristic of permitting the supporting structure, molding and fastener to be assembled in any order desired, so that when necessary or desirable the molding can be applied to the fasteners after the latter have been applied in the apertures in the supporting structure.

This invention also aims to provide an improved type of fastener having an expansible and contractible head and an independently expansible and contractible shank, that is constructed from sheet metal without waste of material and in an extremely simple manner.

Further objects of the invention will appear as a description thereof proceeds with reference to the accompanying drawing, in which Figure 1 is a perspective view of a preferred form of this invention, showing the fastener constructed from spring tempered wire.

Figure 2 is a perspective view of a modified form of a wire fastener, in which the head is bent from the ends rather than the mid-portion of the piece of wire from which the fastener is made.

Figure 3 is a fragmental plan view illustrating a preferred way of utilizing the fastener of Figure 1 in securing a hollow molding having inturned flanges upon a supporting structure.

Figure 4 is a sectional view taken on the plane indicated by the line 4—4 in Figure 3.

Figure 5 is a sectional view taken on the plane indicated by the line 5—5 in Figure 3 looking in the direction of the arrows.

Figure 6 is a sectional view taken on the plane indicated by the line 6—6 in Figure 7 and showing a further modified form of fastener constructed of sheet metal.

Figure 7 is an end view of the sheet metal fastener shown in Figure 6.

Like reference characters indicate like parts throughout the several figures.

Referring to the form of the invention illustrated in Figure 1, the fastener there shown is constructed of spring tempered wire by bending the mid-portion thereof to form a head designated as a whole by the numeral 10 and by bending the ends of the wire to form a shank designated as a whole by 11. The head 10 consists of two open loops 12 and 13 disposed in substantially parallel planes, said loops being connected together by a connecting portion 14 of substantial length, said portion serving to space the loops 12 and 13 a substantial distance from each other for a purpose presently to be described. The spring fastener further includes portions 15 and 16 bent towards each other but terminating in spaced relation, the portions 15 and 16 carrying respectively two outwardly bowed legs 17 and 18 which together constitute the shank of the fastener. The outwardly bowed legs provide holding surfaces 19 and 20 that diverge from the head and guiding surfaces 21 and 22 that converge from the point of maximum outward bowing of the legs to the end of the shank of the fastener at which the legs overlap as illustrated. So far as the shank of the fastener is concerned, its construction and mode of operation is substantially the same as in my Patent No. 1,679,266, granted July 31, 1928.

The fastener just described provides an expansible and contractible head in that both of the loops 12 and 13 may be contracted when pressure is applied to the side of each loop that is opposite the connecting portion 14, which, in the use of the fastener, is free of attachment to the supporting structure. When the head is contracted the planes of contraction are the planes of the loops 12 and 13. When the shank of the fastener is contracted, the plane of contraction, it will be observed, is disposed normal to the planes of contraction of the head, and it will be observed that contraction of the shank of the fastener takes place entirely independently of the expansion or contraction of the head.

Instead of constructing the fastener as in Figure 1, it may be constructed as illustrated in Figure 2, in which the shank of the fastener is constructed from the mid-portion of the wire while the head is constructed from the ends thereof. In the arrangement in Figure 2 the shank of the fastener is formed by doubling the mid-portion of the wire to provide the two outwardly bowed legs 23 and 24 which, in this instance, are connected together at 25, providing a nose or entering portion for the shank of the fastener. In this form of the invention the outwardly bowed legs provide guiding surfaces 26 and 27 corresponding to guiding surfaces 21 and 22 of the fastener first described, and holding surfaces 28 and 29 corresponding respectively to the holding surfaces 19 and 20 of the fastener first described. One end of the piece of wire from which the fastener of Figure 2 is constructed is bent in the plane of the shank, but at right angles thereto providing a connecting portion 36 serving to space the open loop 31 laterally. The tip 32 of this end of the wire terminates a substantial distance from the portion 30 so that the loop 31 remains open thus permitting the free contraction and expansion thereof.

The other end of the piece of wire from which the fastener is formed is turned in the opposite direction from the portion 30 providing a connecting portion 33 that terminates in an open loop 34 disposed in a plane substantially parallel to the plane of the loop 31. The tip of this end of the wire 35 terminates a substantial distance from the portion 33 so as to provide an open loop permitting free contraction thereof.

The wire spring fasteners just described are intended particularly for securing hollow moldings such as are widely used in finishing parts of automobiles upon their supporting structures. Such a molding is illustrated in the drawing and designated by the numeral 36, and the supporting structure which is generally a metallic plate-like support is designated as a whole by the numeral 37. The hollow molding 36, as is customary, includes a body 38 and inturned flanges 39 and 40 that are spaced apart so that the shank of the fasteners employed in securing the molding in place may pass between said flanges, in order that the fasteners may be engaged with the supporting structure. Said structure is provided with apertures 41 preferably at regularly spaced intervals. If desired, the inturned flanges may be slightly bent toward the top of the molding rather than being disposed in the same plane as illustrated. When this arrangement is used the edge walls of said flanges extend at an obtuse angle to the support rather than at right angles as illustrated, and said edge walls will firmly engage the fastener heads.

When the fastener just described is used in securing a molding in place, the shank thereof is preferably first sprung in the aperture 41 in the supporting structure. Each aperture is provided with a fastener by entering the outwardly bowed legs constituting the shank in an aperture. In entering the shanks of the fasteners the guiding surfaces 21 and 22 first engage the outer corners of the apertures 41 and when pressure is applied lengthwise of the shank of the fastener, said shank is contracted permitting the points of maximum outward bowing of the legs to pass through the aperture after which said legs spring apart causing the holding surfaces 19 and 20 to engage the inner corners of the aperture, drawing the head and any part secured thereto firmly against the outer surface of the supporting structure. In utilizing the fastener of the present invention it is preferred that the fasteners be applied to the aligned apertures on the supporting structure before the molding is applied to the heads of the fastener. Said heads, it will be observed, then project away from the outer surfaces of the supporting structure.

After the fasteners have been assembled, as just stated, the loops of adjacent fasteners are arranged in substantial parallelism by turning the fasteners as may be necessary, and the fasteners are then in position to receive the hollow molding which is brought into engagement with the fasteners simply by causing the spaced flanges to engage opposite sides of the open loops constituting the heads of the fasteners. When the hollow molding is brought into engagement with opposite sides of the open loop, and pressure applied tending to force the molding towards the supporting structure, it will be observed that the loops will first be contracted as they are forced between the spaced flanges and after they have passed completely into the hollow moldings, the loops will expand behind the flanges thus firmly holding the molding in position upon the supporting structure.

In view of the fact that the loops constituting the head of the fastener are widely spaced along the length of the molding it will be understood that each fastener holds the molding at two points thus minimizing the number of fasteners that must be used in order to provide adequate support for the molding at a multiplicity of spaced points.

In applying the molding it will be observed that the heads provide fixed and movable shoulders behind which the inturned flanges of the molding are engaged. The fixed shoulder is provided by the side of the loop that is directly attached to the shank of the fastener, while the movable shoulder is provided by the opposite side of the loop which, as above stated, is free of attachment to the shank that, in applied position of the fastener, is disposed in the aperture of the supporting structure.

Instead of constructing the fastener of wire, it may be constructed from sheet metal without waste of material as illustrated in Figures 6 and 7. The fastener of these figures is preferably constructed from a rectangular blank of resilient material. The blank is bent into tubular form providing a head 42 of elongated form. The edges 43 and 44 of the blank, the body of which forms the head of the fastener, are substantially spaced, as illustrated, so that the head may be contracted in entering it between the inturned flanges of a molding, as above described, said head then expanding behind said flanges.

The shank 45 of the fastener of this form of the invention is formed by cutting tongues 46 and 47 from the body of the blank and bending them toward each other. The tongues are outwardly bowed between the head and the ends thereof providing legs having holding and guiding surfaces functioning as above described with reference to the fasteners illustrated in Figures 1 and 2. In use, the fastener of Figures 6 and 7 operates and is applied as above described with reference to the wire fasteners.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A double snap fastener formed entirely from a single piece of metal folded into a construction adapted to secure together two apertured members, one end portion of said fastener having two widely spaced oppositely arranged portions yieldable toward and away from each other in parallel planes and shaped to make snap fastening engagement with one of said members through its aperture and the other end portion of said fastener having oppositely arranged portions yieldable toward and away from each other in a plane normal to said first-named planes and shaped to engage the other member through its aperture and the neck portion of the fastener between the pairs of oppositely disposed yieldable portions lying wholly within the apertures of said two members.

2. A double snap fastener formed entirely from a single piece of metal bent into a construction adapted to secure a molding having spaced inturned flanges to an apertured supporting structure, the portion of the fastener designed for snap fastening engagement with the molding having two widely spaced oppositely arranged portions yieldable toward and away from each other in parallel planes when the molding flanges are engaged therewith, and the portion of the fastener designed for snap fastener engagement with an aperture of said structure having oppositely arranged portions yieldable toward and away from each other in a plane normal to said first-named planes, said last-named portions being shaped to provide relatively long inclined holding shoulders diverging away from the molding engaging portion.

3. A double snap fastener formed entirely from a single piece of metal bent into a construction adapted to secure a molding having spaced inturned flanges to an apertured supporting structure, the portion of the fastener designed for snap fastening engagement with the molding having two widely spaced oppositely arranged portions yieldable toward and away from each other in parallel planes when the molding flanges are engaged therewith, and the portion of the fastener designed for snap fastener engagement with an aperture of said structure having oppositely arranged portions yieldable toward and away from each other in a plane normal to said first-named planes, said last-named portions consisting in two outwardly bowed legs arranged to pass each other in scissors fashion whereby each leg can freely yield independently of the other.

BION C. PLACE.